(12) United States Patent
Masias et al.

(10) Patent No.: US 10,634,003 B2
(45) Date of Patent: Apr. 28, 2020

(54) METHODS AND APPARATUS TO CONTROL THE ACTUATION OF REGULATORS INCLUDING A LOADING CHAMBER

(71) Applicant: Emerson Process Management Regulator Technologies, Inc., McKinney, TX (US)

(72) Inventors: Justin Lane Masias, McKinney, TX (US); William Kevin Burke, Allen, TX (US); Paul Richard Anderson, Melissa, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 466 days.

(21) Appl. No.: 15/411,452

(22) Filed: Jan. 20, 2017

(65) Prior Publication Data
US 2018/0209297 A1    Jul. 26, 2018

(51) Int. Cl.
*F01D 21/14* (2006.01)
*F02C 9/46* (2006.01)
(Continued)

(52) U.S. Cl.
CPC ............ *F01D 21/14* (2013.01); *F01D 21/00* (2013.01); *F02C 7/00* (2013.01); *F02C 7/22* (2013.01);
(Continued)

(58) Field of Classification Search
CPC .. F02C 7/232; F02C 9/263; F02C 9/46; F02C 9/28; F01D 21/00; F01D 21/06;
(Continued)

(56) References Cited

U.S. PATENT DOCUMENTS 3,977,423 A * 8/1976 Clayton ............... G05D 16/166
137/12
4,300,347 A * 11/1981 Smith ..................... F02C 9/263
60/39.281
(Continued)

FOREIGN PATENT DOCUMENTS

EP         2728202         5/2014

OTHER PUBLICATIONS

International Search Authority, "Partial Search Report and Invitation to Pay Additional Fees," issued in connection with International Patent Application No. PCT/2018/013103, dated May 18, 2018, 5 pages.
Tartarini, "Type FL Pressure Reducing Regulators," Emerson Instruction Manual D103068X012, www.tartarini-naturalgas.com, Jan. 2017, 36 pages.
(Continued)

*Primary Examiner* — Andrew H Nguyen
(74) *Attorney, Agent, or Firm* — Hanley, Flight & Zimmerman, LLC (57) ABSTRACT

Methods and apparatus to control the actuation of regulators including a loading chamber are disclosed. An example apparatus includes a first pneumatic regulator including a loading chamber, the first pneumatic regulator to flow fluid toward a downstream process; a second pneumatic regulator coupled between the loading chamber and the downstream process, the second pneumatic regulator to control an actuation of the first pneumatic regulator during normal operation based on a pressure difference between a first pressure downstream of the first pneumatic regulator and a second pressure within the loading chamber; and a valve coupled between the loading chamber and the downstream process, the valve to control the actuation of the first pneumatic regulator during a shut-down event.

17 Claims, 7 Drawing Sheets

(51) Int. Cl.
  *F02C 7/22* (2006.01)
  *G05D 16/20* (2006.01)
  *F02C 7/00* (2006.01)
  *F01D 21/00* (2006.01)

(52) U.S. Cl.
  CPC ........... *F02C 9/46* (2013.01); *G05D 16/2093* (2013.01); *F05D 2270/09* (2013.01); *F05D 2270/301* (2013.01); *F05D 2270/65* (2013.01); *F15B 2211/405* (2013.01); *F15B 2211/40576* (2013.01); *F15B 2211/6656* (2013.01)

(58) Field of Classification Search
  CPC ................. F01D 21/14; F05D 2270/09; F05D 2270/301; F05D 2270/65; F16K 31/126; F16K 31/1262; F16K 31/165; F16K 31/365; F16K 31/385; F16K 31/402
  See application file for complete search history.

(56) References Cited

U.S. PATENT DOCUMENTS

| | | | | |
|---|---|---|---|---|
| 5,448,882 | A | * | 9/1995 | Dyer ................. F02C 7/228 60/39.281 |
| 6,381,946 | B1 | * | 5/2002 | Wernberg ............. F02C 9/263 60/39.281 |
| 9,298,189 | B2 | * | 3/2016 | Oksanen ................. G05D 7/03 |
| 2010/0071787 | A1 | * | 3/2010 | Folk ..................... F16K 31/365 137/489 |
| 2015/0211552 | A1 | | 7/2015 | Burgett et al. |

OTHER PUBLICATIONS

Tartarini, "Type FL Pressure Reducing Regulators," Emerson Instruction Manual Form 5733, www.tartarini-naturalgas.com, Feb. 2011, 28 pages.

* cited by examiner

METHODS AND APPARATUS TO CONTROL THE ACTUATION OF REGULATORS INCLUDING A LOADING CHAMBER

FIELD OF THE DISCLOSURE

This disclosure relates generally to regulators and, more particularly, to methods and apparatus to control the actuation of regulators including a loading chamber.

BACKGROUND

Regulators are sometimes used to control the flow of fluids to a downstream process. In some instances, when the downstream pressure satisfies a first threshold, the regulator closes. When the downstream pressure satisfies a second threshold, the regulator opens.

SUMMARY

An example apparatus includes a first pneumatic regulator including a loading chamber, the first pneumatic regulator to flow fluid toward a downstream process; a second pneumatic regulator coupled between the loading chamber and the downstream process, the second pneumatic regulator to control an actuation of the first pneumatic regulator during normal operation based on a pressure difference between a first pressure downstream of the first pneumatic regulator and a second pressure within the loading chamber; and a valve coupled between the loading chamber and the downstream process, the valve to control the actuation of the first pneumatic regulator during a shut-down event.

An example method includes processing turbine status data to identify a shut-down event; and in response to identifying the shut-down event, causing a first valve to close to deter fluid from flowing into a turbine, and causing a second valve to open to flow fluid out of a loading chamber of a regulator to close the regulator to deter fluid from flowing to the turbine.

An example method includes controlling an actuation of a regulator during normal operation using a pneumatic regulator, the pneumatic regulator responsive to a pressure difference between a first pressure downstream of the regulator and a second pressure within a loading chamber of the regulator; and controlling the actuation of the regulator during a shut-down event using a valve, the valve responsive to a control signal.

An example apparatus includes a first pneumatic regulator including a loading chamber, the first pneumatic regulator to flow fluid toward a downstream process; a second pneumatic regulator coupled between the loading chamber and the downstream process, the second pneumatic regulator to control an actuation of the first pneumatic regulator during normal operation based on a pressure difference between a first pressure downstream of the first pneumatic regulator and a second pressure within the loading chamber of the regulator; and a valve coupled between the loading chamber and an upstream process relative to the first pneumatic regulator, the valve to control the actuation of the first pneumatic regulator during a low-pressure event.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

The examples disclosed herein relate to regulating fluid flow to downstream processes during a shut-off and/or shut-down event. In some examples, the shut-off event includes a process controller causing a first valve immediately adjacent a turbine of a natural-gas power plant to close to deter or prevent additional fuel and/or fluid from flowing into the turbine. However, if a main regulator upstream of the first valve remains open after the first valve is closed once the shut-off event has been detected, the fluid and/or fuel may continue to flow toward the first valve and a pressure within a fluid path between the first valve and the main regulator may increase.

To deter or prevent the pressure within the fluid path between the first valve and the main regulator from exceeding a threshold that may cause a relief valve to actuate, which may incur downtime, the examples disclosed herein enable the main regulator to be actuated (e.g. closed) quickly by opening a second valve to evacuate a loading chamber of the main regulator. In some examples, the second valve is coupled between the loading chamber and the fluid path between the first valve and the main regulator. When the loading chamber is evacuated and/or when the pressure within the loading chamber is reduced, the main regulator closes to deter or prevent additional fuel and/or fluid from flowing toward the first valve and/or the turbine. The second valve may be actuated using a control signal (e.g., an electrical control signal) that is the same or based on the same signal that causes the first valve to close when a shut-off event is detected.

Additionally, the examples disclosed herein may be used to regulate fluid flow to downstream processes during low pressure events. To deter or prevent the pressure within the fluid path between the turbine and the main regulator from being below a threshold, the examples disclosed herein relate to causing the main regulator to actuate (e.g., open) quickly by opening a second valve to flow fluid into a loading chamber of the main regulator. In some examples, the second valve is coupled between the loading chamber of the main regulator and a fluid path upstream of the main regulator. By loading the loading chamber and/or increasing the pressure within the main regulator, the main regulator opens quickly to enable additional fuel and/or fluid to flow toward the first valve and/or the turbine.

Figure 1:
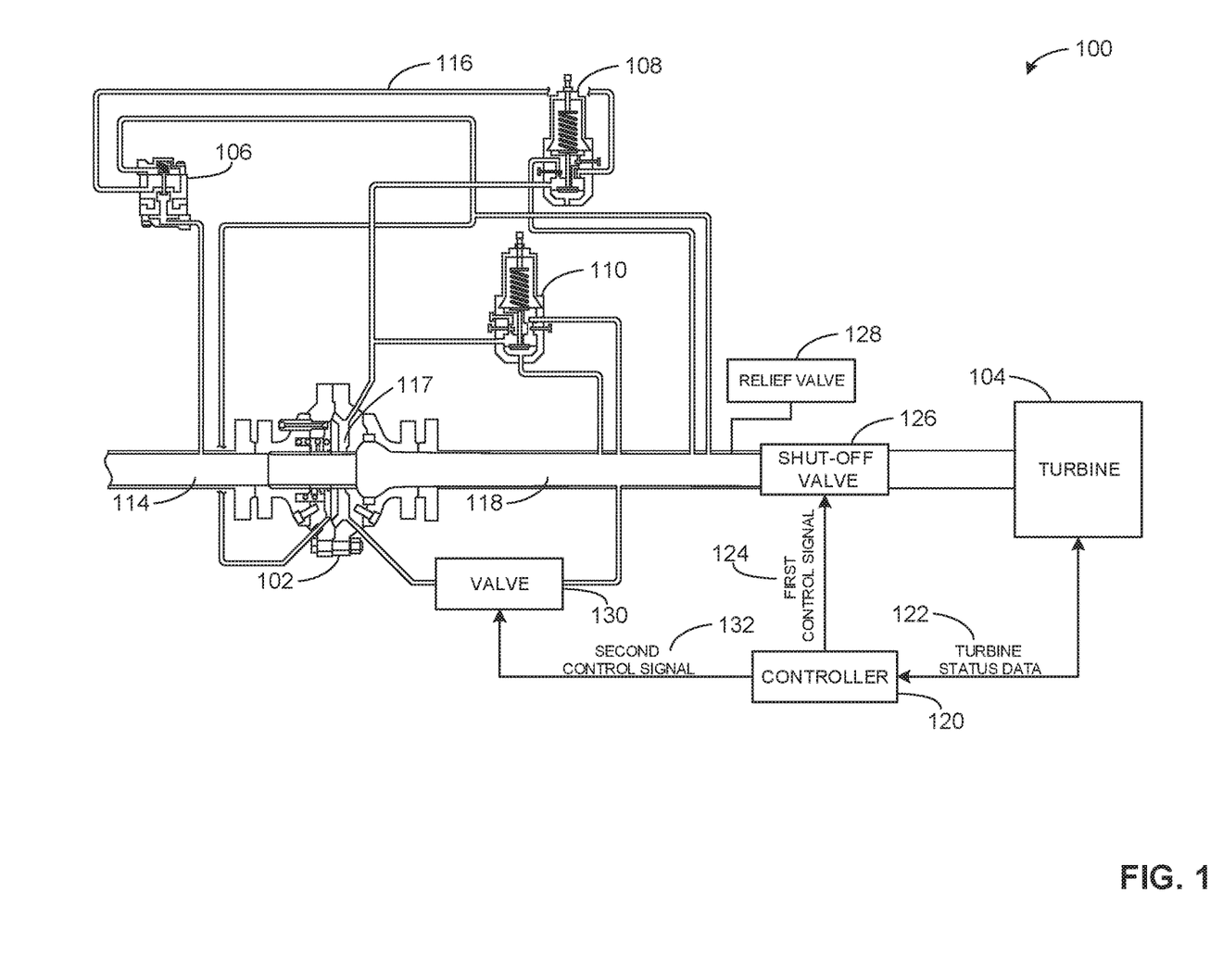
FIG. 1 is an example process control system used to control fluid flow to a turbine.

FIG. 1 is a schematic illustration of an example process control system 100 including a main regulator 102 that regulates a flow of fluid and/or fuel to a turbine and/or downstream process 104. In the illustrated example, to control the position of the main regulator 102 and, in turn, flow fluid and/or fuel to the turbine 104, the process control system 100 includes a first regulator 106, a second regulator 108 and a third regulator 110.

In the example of FIG. 1, the first regulator 106 reduces an upstream pressure 114 to a second pressure 116, the second regulator 108 regulates the flow of fluid into a loading chamber 117 of the main regulator 102 and the third regulator 110 regulates the flow of fluid out of the loading chamber 117. Specifically, in this example, the second regulator 108 causes the main regulator 102 to open by flowing fluid into the loading chamber 117 based on a difference between a spring force of the second regulator 108 and a downstream pressure 118 acting on the second regulator 108. Additionally, in this example, the third regulator 110 causes the main regulator 102 to close during normal operation by flowing fluid out of the loading chamber 117 based on a difference between a spring force of the third regulator 110 and the downstream pressure 118 acting on the third regulator 110.

In operation, a shut-off event of the turbine 104 may occur. To monitor for such an event, the illustrated example includes a controller 120 that accesses turbine status data 122 from the turbine 104 and/or a related sensor(s) to determine if a shut-off event has occurred. In some examples, when the controller 120 detects a shut-off event, the controller 120 generates a first control signal 124 that causes a shut-off valve 126 to close and deter or prevent additional fluid and/or fuel from flowing toward the turbine 104. If the shut-off valve 126 is closed and the main regulator 102 continues to flow fluid and/or fuel toward the turbine 104, the downstream pressure 118 may increase above a threshold where a relief valve 128 vents the downstream pressure 118 to atmosphere before the third regulator 110 senses the increase in the downstream pressure 118.

To avoid the downtime that may be incurred if the relief valve 128 vents the downstream pressure 118 to atmosphere, the example process control system 100 includes a valve and/or solenoid 130 that is coupled between the loading chamber 117 and the downstream pressure 118. Thus, in the illustrated example, when the controller 120 detects a shut-off event, the controller 120 generates a second control signal 132 that causes the valve 130 to open to flow fluid out of the loading chamber 117 to reduce the pressure therein to enable the main regulator and/or pneumatic regulator 102 to close relatively quickly after a shut-off event is detected to deter or prevent additional fluid and/or fuel from flowing to the turbine 104. In some examples, the main regulator 102 closes at a substantially faster rate (e.g., approximately 88% faster) based on the valve 130 evacuating the loading chamber 117 as compared to if the third regulator 110 was used to evacuate the loading chamber 117. Thus, the third regulator 110 may be used to evacuate the loading chamber 117 during normal operation of the process control system 100 and the valve 130 may be used to evacuate the loading chamber 117 when the controller 120 detects a shut-off event.

Figure 2:
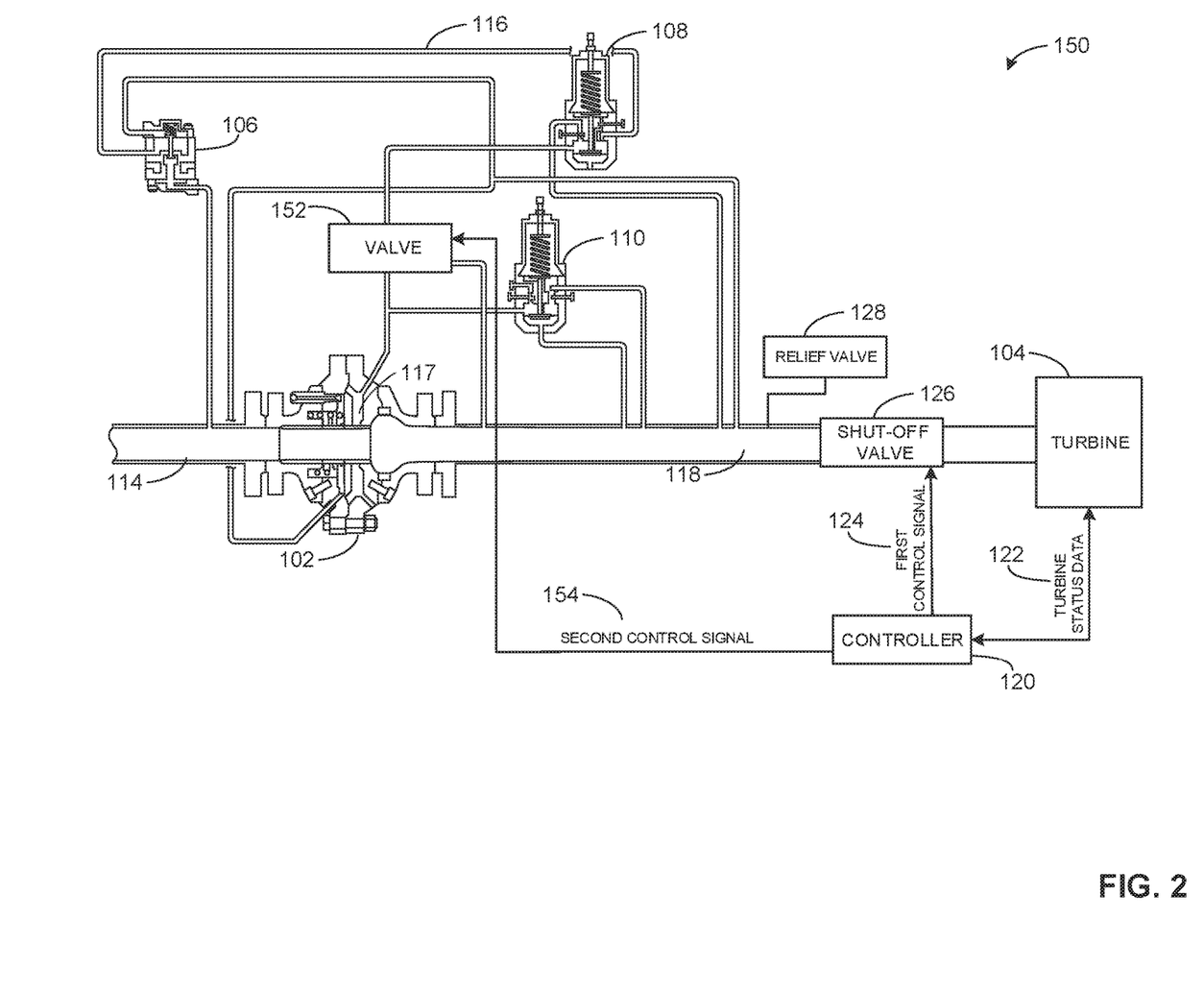
FIG. 2 is another example process control system used to control fluid flow to the turbine of FIG. 1.

FIG. 2 is a schematic illustration of an example process control system 150 that is similar to the example process control system 100 of FIG. 1. However, in contrast to the example process control system 100 of FIG. 1, the example process control system 150 includes a valve 152 that is implemented as a three-way valve that controls the flow of fluid between the second regulator 108 and the loading chamber 117 of the main regulator 102 and the downstream pressure 118.

In operation, when the controller 120 detects a shut-off event, the controller 120 generates the first control signal 124 that causes the shut-off valve 126 to close and a second control signal 154 that causes the valve 152 to stop the upstream pressure 114 from flowing into the loading chamber 117 and enables fluid flow out of the loading chamber 117 to close the main regulator 102 relatively quickly after the shut-off event is detected to deter or prevent additional fluid and/or fuel from flowing to the turbine 104. Thus, in the example of FIG. 2, the valve 152 deters fluid from flowing into the loading chamber 117 when the controller 120 detects a shut-off event.

Figure 3:
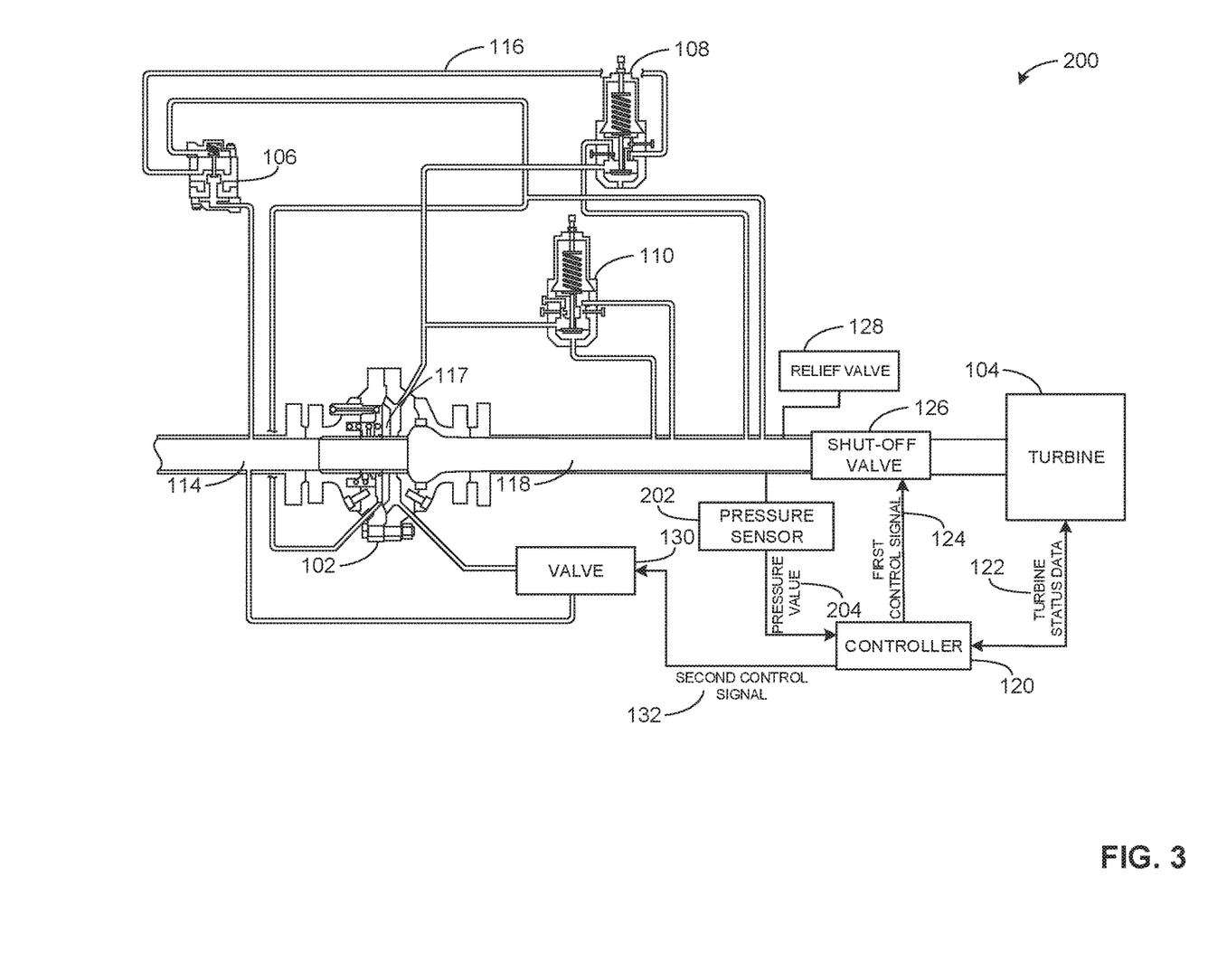
FIG. 3 is another example process control system used to control fluid flow to the turbine of FIG. 1.

FIG. 3 is a schematic illustration of an example process control system 200 that is similar to the example process control system 100 of FIG. 1. However, in contrast to the example process control system 100 of FIG. 1, the valve 130 is coupled between the loading chamber 117 of the main regulator 102 and the upstream pressure 114 instead of being coupled to the downstream pressure 118. Thus, the example process control system 200 enables direct fluid flow into the loading chamber 117 from the upstream pressure 114.

In operation, the controller 120 accesses the turbine status data 122 from the turbine 104 and a pressure sensor 202 measures a pressure value 204 of the downstream pressure 118 and provides the controller 120 access to the pressure value 204. In some examples, the controller 120 accesses the turbine status data 122 and compares the pressure value 204 to a reference value to determine if the pressure value 204 is below a threshold and/or at a level at which additional fluid and/or fuel may be used by the turbine 104. In the illustrated example, when the pressure value 204 is below the reference value and/or when the pressure value 204 satisfies a threshold, the controller 120 generates the second control signal 132 that is provided and/or accessible by the valve 130 and that causes the valve 130 to open. In the example of FIG. 3, opening the valve 130 enables the upstream pressure 114 to load the loading chamber 117 to quickly actuate (e.g., open) the main regulator 102 to flow additional fluid and/or fuel to the turbine 104.

Figure 4:
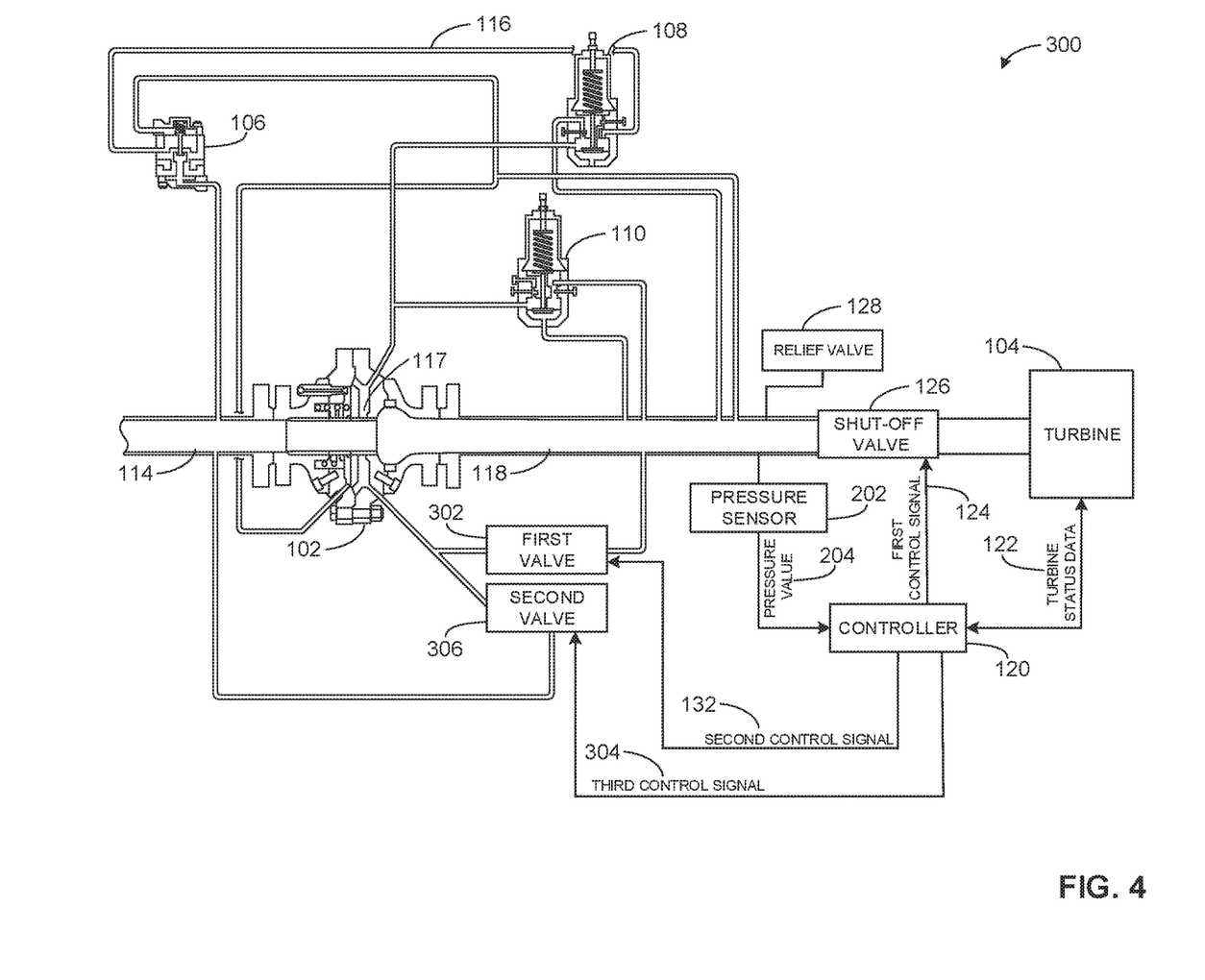
FIG. 4 is yet another example process control system used to control fluid flow to the turbine of FIG. 1.

FIG. 4 is a schematic illustration of an example process control system 300 that is a combination of the example process control system 100 of FIG. 1 and the example process control system 200 of FIG. 3. As such, in the example of FIG. 4, when the controller 120 detects a shut-off event, the controller 120 generates the first control signal 124 to close the shut-off valve 126 and generates the second control signal 132 to open a first valve 302 to reduce the pressure within the loading chamber 117 and cause the main regulator 102 to close. Additionally, in the example of FIG. 4, when the controller 120 determines that the pressure value 204 is below a reference value, the controller 120 generates a third control signal 304 that causes a second valve 306 to open to increase the pressure within the loading chamber 117 to cause the main regulator 102 to open. In some examples, when the controller 120 actuates the first valve 302 to the open position, the second valve 306 is in the closed position. In some examples, when the controller 120 actuates the second valve 306 to the open position, the first valve 302 is in the closed position.

Figure 5:
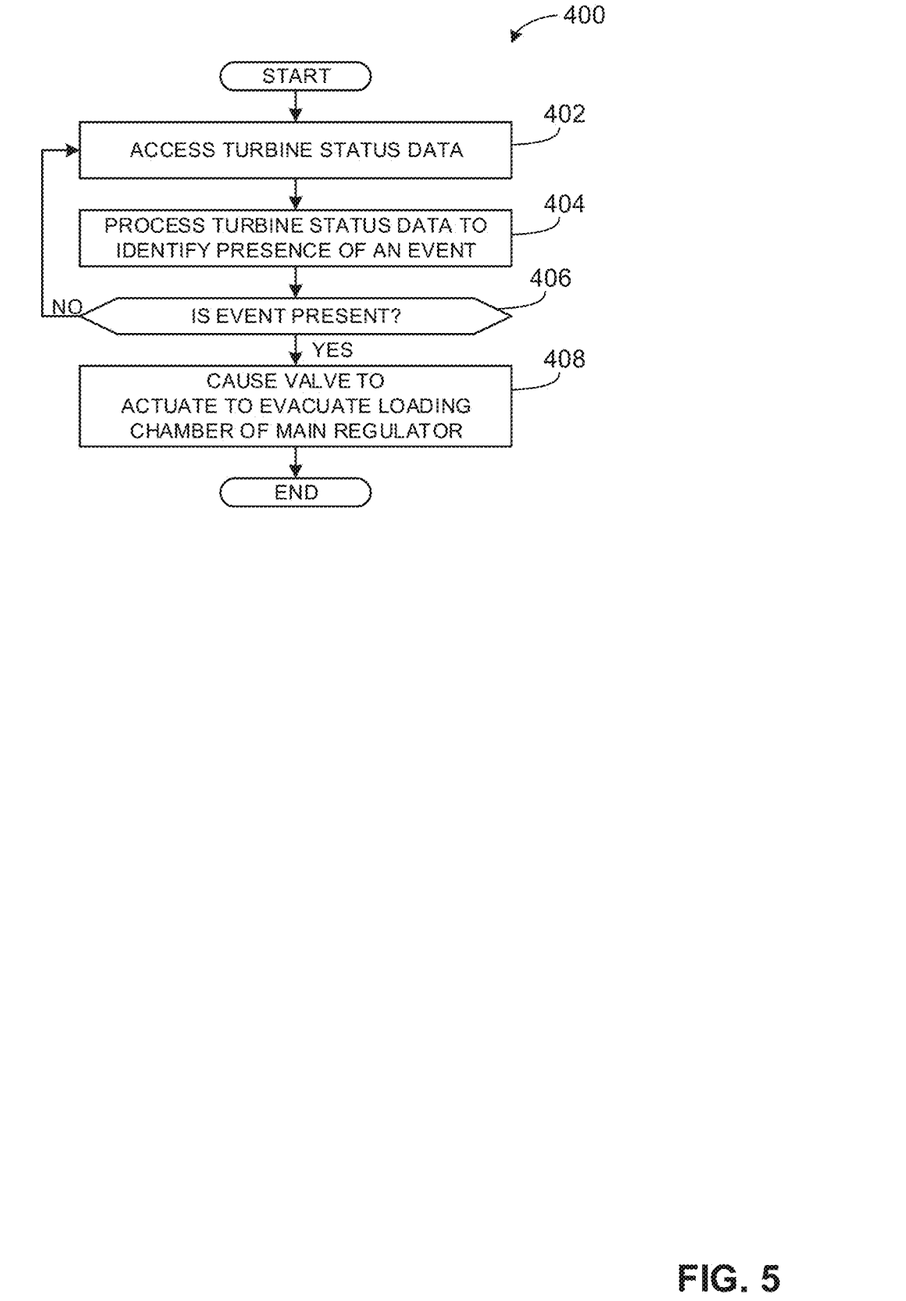
FIG. 5 is a flowchart representing a method that may be used to implement the controller of FIGS. 1, 2 and 4.
Figure 6:
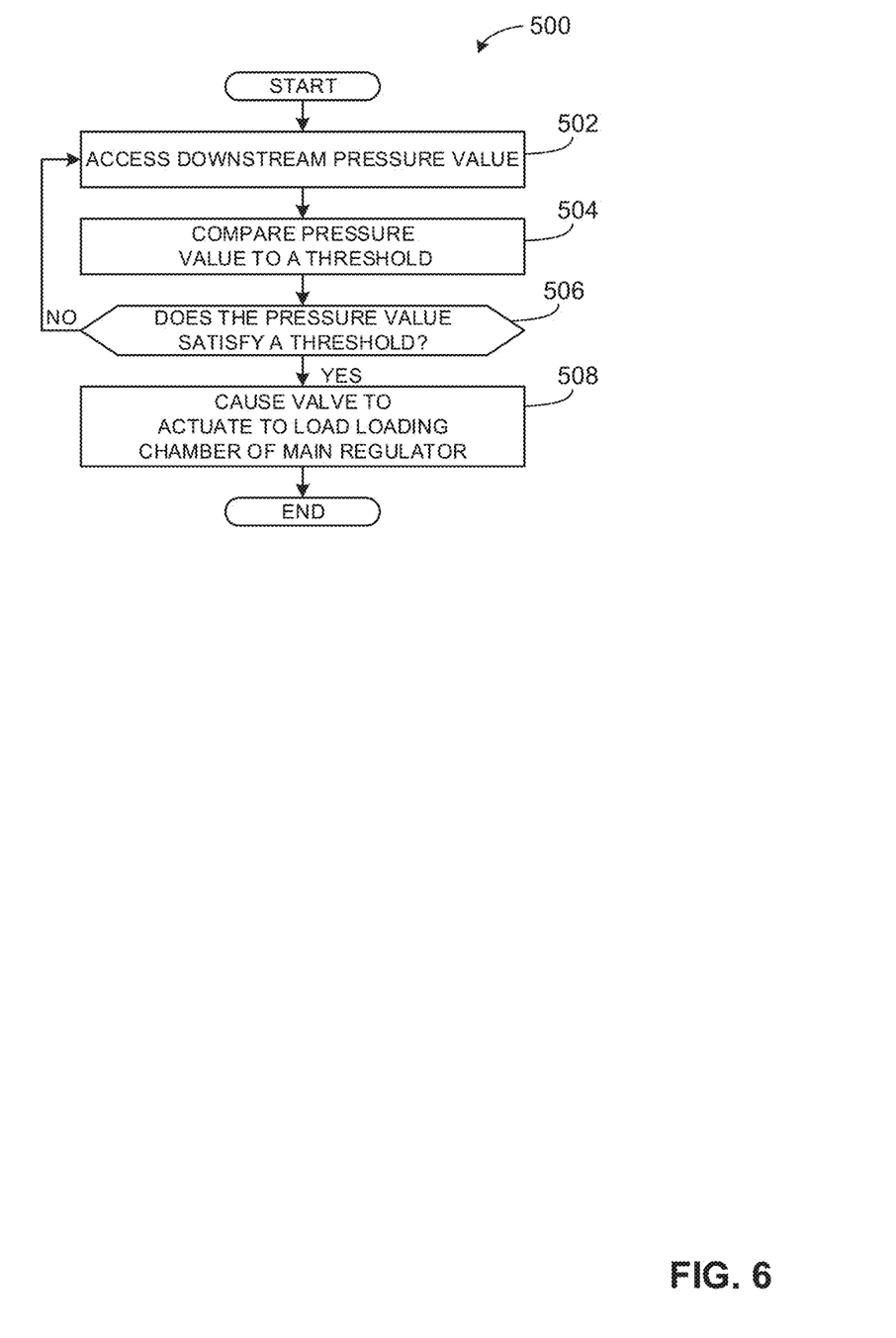
FIG. 6 is a flowchart representing a method that may be used to implement the controller of FIGS. 3 and 4.

Flowcharts representative of example methods for implementing the controller 120 of FIGS. 1-4 are shown in FIGS. 5 and 6. In this example, the methods may be implemented using machine readable instructions that comprise a program for execution by a processor such as the processor 612 shown in the example processor platform 600 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 5 and 6, many other methods of implementing the example controller 120 may alternatively be used. For example, the order of execution of the blocks may be changed, and/or some of the blocks described may be changed, eliminated, or combined.

As mentioned above, the example methods of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The method 400 of FIG. 5 begins with the controller 120 accessing the turbine status data 122 (block 402). The controller 120 processes the turbine status data 122 to determine if a shut-off event is present (block 404). For example, a shut-off event may occur based on scheduled maintenance and/or if operating parameters of the turbine 104 are outside of range. At block 406, if the controller 120 does not detect a shut-off event, the method 400 returns to block 402. However, if the controller 120 detects a shut-off event at block 406, the controller 120 causes the valve 130 to open to reduce the pressure within the loading chamber 117 to close the main regulator 102 relatively quickly after a shut-off event is detected and deter or prevent additional fluid and/or fuel flow to the turbine 104 (block 408).

The method 500 of FIG. 6 begins with the controller 120 accessing the downstream pressure value 204 (block 502). The controller 120 compares the pressure value 204 to a reference value to determine if the pressure value 204 satisfies a threshold (block 504). In some examples, the pressure value 204 satisfies a threshold when the pressure value 204 is less than a reference value indicative of the turbine 104 requiring additional fluid and/or fuel. At block 506, if the controller 120 determines that the pressure value 204 does not satisfy the threshold, the program returns to block 502. However, if the controller 120 determines that the pressure value 204 satisfies the threshold at block 506, the controller 120 causes the valve 130 to open to increase the pressure within the loading chamber 117 to open the main regulator 102 relatively quickly to flow additional fluid and/or fuel to the turbine 104 (block 508).

Figure 7:
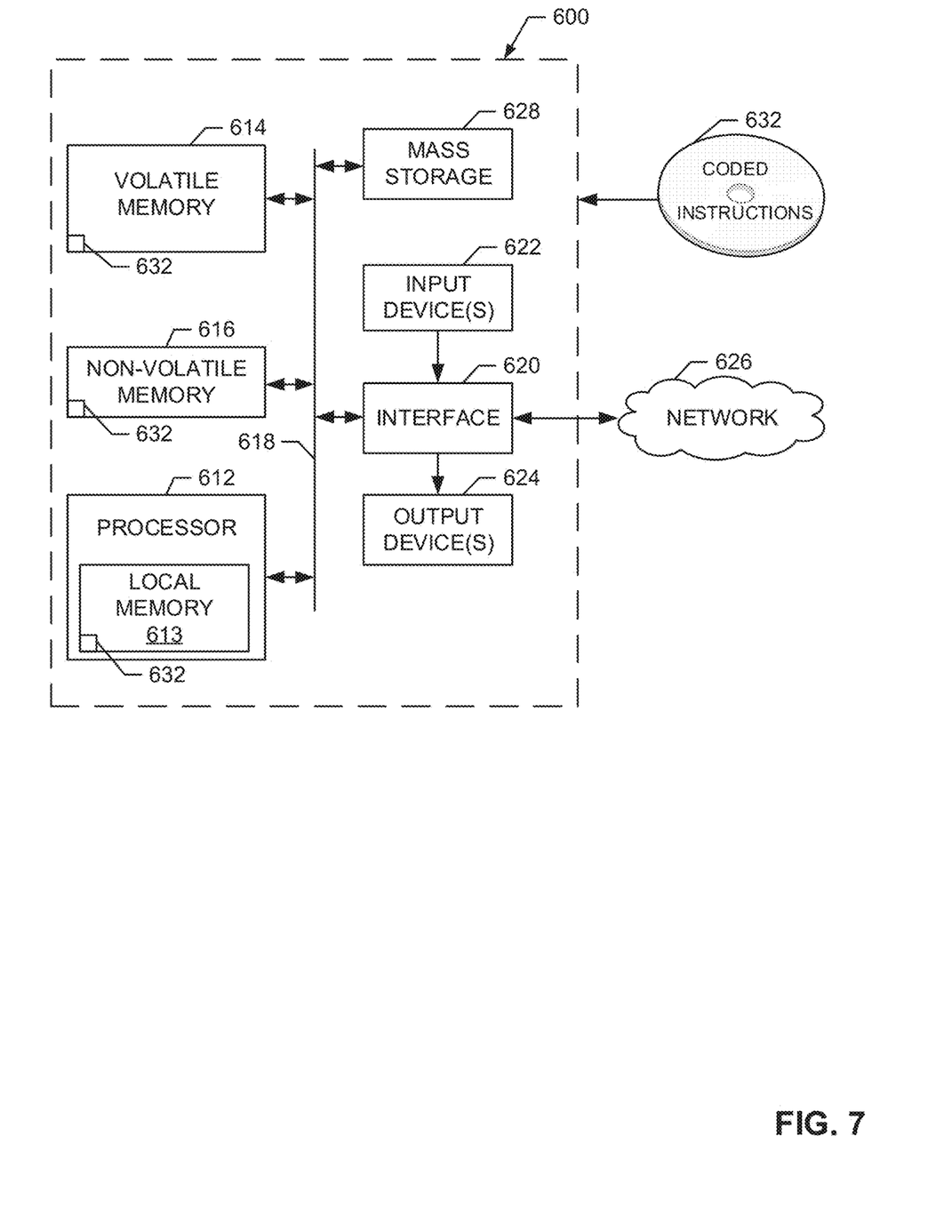
FIG. 7 is a processor platform that may be used to execute instructions to implement the methods of FIGS. 5 and 6 and the controller of FIGS. 1-4.

FIG. 7 is a block diagram of an example processor platform 600 capable of executing instructions to implement the methods of FIGS. 5 and 6 and the apparatus of FIGS. 1-4. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 to implement the methods of FIGS. 4 and 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture relate to controlling the actuation of regulators including a loading chamber to more rapidly cause a main regulator to actuate to a closed position and/or to reduce downtime when a shut-off event occurs. Specifically, the examples disclosed herein include generating a control signal during an event that causes a valve and/or solenoid coupled to the loading chamber to actuate.

In some examples, the event includes a low pressure event in which the pressure downstream of the main regulator does not satisfy a threshold. In examples in which the event includes a low-pressure event, actuating the valve and/or solenoid causes fluid upstream of the main regulator to flow into the loading chamber to actuate the main regulator and enable the higher-pressure upstream fluid to flow downstream. In other words, actuating the valve and/or solenoid increases the pressure within the loading chamber to open the main regulator.

In some examples, the event includes a shut-off event. In examples in which the event includes a shut-off event, actuating the valve and/or solenoid causes fluid within the loading chamber to flow out of the loading chamber to decrease the pressure within the loading chamber to close the main regulator. By evacuating the loading chamber and/or reducing the pressure within the main regulator, the main regulator closes to deter additional or prevent fuel and/or fluid from flowing downstream and/or toward downstream processes (e.g., a turbine).

The examples disclosed herein may reduce the actuation time of a main regulator during a shut-off event by approximately 88% as compared to some known apparatus. As such, the examples disclosed herein reduce the likelihood of pressure between a turbine and the main regulator increasing above a threshold where a relief valve would be actuated and additional down-time would be incurred.

An example apparatus includes a first pneumatic regulator including a loading chamber, the first pneumatic regulator to flow fluid toward a downstream process; a second pneumatic regulator coupled between the loading chamber and the downstream process, the second pneumatic regulator to control an actuation of the first pneumatic regulator during normal operation based on a pressure difference between a first pressure downstream of the first pneumatic regulator and a second pressure within the loading chamber of the first pneumatic regulator; and a valve coupled between the loading chamber and the downstream process, the valve to control the actuation of the first pneumatic regulator during a shut-down event.

In some examples, the downstream process comprises a turbine and further comprises a controller, the controller to process turbine status data to identify the shut-down event, in response to identifying the shut-down event, the controller to cause the valve to open to flow fluid out of the loading chamber to cause the first pneumatic regulator to close. In some examples, the valve is a first valve, and, wherein, in response to identifying the shut-down event, the controller is to cause a second valve to close to deter fluid flow into the turbine. In some examples, the valve is a first valve, and further includes a second valve coupled between the loading chamber and an upstream process, the second valve to control the actuation of the first pneumatic regulator during a low-pressure event at the downstream process. In some examples, the apparatus includes a controller, the controller to process turbine status data to identify the low-pressure event, in response to identifying the low-pressure event, the controller to cause the second valve to open to flow fluid into the loading chamber to cause the first pneumatic regulator to open.

An example method includes processing turbine status data to identify a shut-down event; and in response to identifying the shut-down event, causing a first valve to close to deter fluid from flowing into a turbine, and causing a second valve to open to flow fluid out of a loading chamber of a regulator to close the regulator to deter fluid from flowing to the turbine. In some examples, flowing fluid out of the loading chamber includes flowing the fluid out of the loading chamber to a flowline coupling the regulator and the turbine. In some examples, prior to identifying the shut-down event, the first valve is open and the second valve is closed. In some examples, the method includes processing the turbine status data to identify a low-pressure event prior to identifying the shut-down event, in response to identifying the low-pressure event, causing a third valve to open to flow fluid into the loading chamber to open the regulator to enable fluid to flow to the turbine.

An example method includes controlling an actuation of a regulator during normal operation using a pneumatic regulator, the pneumatic regulator responsive to a pressure difference between a first pressure downstream of the regulator and a second pressure within a loading chamber of the regulator; and controlling the actuation of the regulator during a shut-down event using a valve, the valve responsive to a control signal. In some examples, the valve is coupled between the loading chamber and a flowline downstream of the regulator, when the valve is in an open position, fluid is to flow from the loading chamber to the flowline to cause the regulator to close. In some examples, the control signal is a first control signal and the valve is a first valve, further including controlling the actuation of the regulator during normal operation using a second valve, the second valve responsive to a second control signal.

In some examples, the second valve is coupled between the loading chamber and a flowline upstream of the regulator, when the second valve is in an open position, fluid is to flow into the loading chamber to cause the regulator to open. In some examples, the method includes identifying the shut-down event by processing turbine status data. In some examples, the valve is a first valve, wherein in response to identifying the shut-down event, causing a second valve to close the turbine to deter fluid from flowing into the turbine. In some examples, in response to identifying the shut-down event, causing the valve to actuate to flow fluid out of the loading chamber to deter fluid from flowing downstream.

An example apparatus includes a first pneumatic regulator including a loading chamber, the first pneumatic regulator to flow fluid toward a downstream process; a second pneumatic regulator coupled between the loading chamber and the downstream process, the second pneumatic regulator to control an actuation of the first pneumatic regulator during normal operation based on a pressure difference between a first pressure downstream of the first pneumatic regulator and a second pressure within the loading chamber; and a valve coupled between the loading chamber and an upstream process relative to the first pneumatic regulator, the valve to control the actuation of the first pneumatic regulator during a low-pressure event.

In some examples, the downstream process comprises a turbine and further comprises a controller, the controller to process turbine status data to identify the low-pressure event, in response to identifying the low-pressure event, the controller to cause the valve to open to flow fluid into the loading chamber to cause the first pneumatic regulator to open. In some examples, the valve is a first valve and further including a second valve coupled between the loading chamber and a downstream process, the second valve to control the actuation of the first pneumatic regulator during a shut-down event. In some examples, the apparatus includes a controller, the controller to process turbine status data to identify the shut-down event, in response to identifying the shut-down event, the controller to cause the second valve to open to flow fluid out of the loading chamber to cause the first pneumatic regulator to close.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a first pneumatic regulator including a loading chamber, the first pneumatic regulator configured to flow fluid toward a downstream process;
   a second pneumatic regulator in fluid communication with the loading chamber and the downstream process, the second pneumatic regulator configured to control an actuation of the first pneumatic regulator during normal operation;
   a first valve in fluid communication with the loading chamber and the downstream process, the first valve to cause the first pneumatic regulator to move to a closed position during a shut-down event; and
   a second valve in fluid communication with the loading chamber and an upstream process, the second valve to cause the first pneumatic regulator to move to an open position during a low-pressure event at the downstream process.

2. The apparatus of claim 1, wherein the downstream process comprises a turbine and further comprising a controller, the controller configured to process turbine status data to identify the shut-down event, wherein in response to identifying the shut-down event, the controller configured to cause the first valve to open to flow fluid out of the loading chamber to cause the first pneumatic regulator to move to the closed position.

3. The apparatus of claim 2, wherein in response to identifying the shut-down event, the controller is configured to cause a shut-off valve to close to deter fluid flow into the turbine.

4. The apparatus of claim 1, further comprising a controller, the controller configured to process turbine status data to identify the low-pressure event, wherein in response to identifying the low-pressure event, the controller is configured to cause the second valve to open to flow fluid into the loading chamber to cause the first pneumatic regulator to open.

5. An apparatus, comprising:
   a first pneumatic regulator including a loading chamber, the first pneumatic regulator configured to flow fluid toward a downstream process, wherein the downstream process comprises a turbine;
   a second pneumatic regulator in fluid communication with the loading chamber and the downstream process, the second pneumatic regulator configured to control an actuation of the first pneumatic regulator during normal operation; and
   a first valve in fluid communication with the loading chamber and an upstream process relative to the first pneumatic regulator, the first valve configured to control the actuation of the first pneumatic regulator during a low-pressure event.

6. The apparatus of claim 5, further comprising a controller configured to process turbine status data to identify the low-pressure event, wherein in response to identifying the low-pressure event, the controller is configured to cause the first valve to open to flow fluid into the loading chamber to cause the first pneumatic regulator to move to an open position.

7. The apparatus of claim 5, further including a second valve in fluid communication with the loading chamber and the downstream process, the second valve configured to cause the first pneumatic regulator to move to a closed position during a shut-down event.

8. The apparatus of claim 7, further comprising a controller configured to process turbine status data to identify the shut-down event, in response to identifying the shut-down event, the controller is configured to cause the second valve to open to flow fluid out of the loading chamber to cause the first pneumatic regulator to close.

9. A process control system comprising:
   a main fluid regulator movable between a first open position and a first closed position to regulate a pressure of a process fluid from an upstream pressure to a downstream pressure, the main fluid regulator having a loading chamber to receive a control fluid from a pilot system in fluid communication with the upstream pressure and the downstream pressure;
   a controller configured to detect a shut-off event of a process equipment to receive the downstream pressure;
   a first valve in fluid communication with the loading chamber and the downstream pressure, the controller, in response to the controller detecting the shut-off event, to provide a first signal to the first valve to cause the first valve to move to a second open position to vent the control fluid from the loading chamber and cause the main fluid regulator to move to the first closed position to prevent the process fluid from flowing through the main fluid regulator and to the process equipment; and
   a second valve in fluid communication with the upstream pressure and the loading chamber.

10. The system of claim 9, wherein the controller is configured to monitor the downstream pressure and detect if the downstream pressure does not exceed a pressure threshold.

11. The system of claim 10, wherein the controller is configured to cause the second valve to move to a third open position in response to the controller detecting that the downstream pressure does not exceed the pressure threshold, the second valve to provide upstream pressure to the loading chamber to cause the main fluid regulator to move to the first open position to allow process fluid to flow through the main fluid regulator and to the process equipment.

12. The system of claim 11, wherein in response to the controller detecting that the downstream pressure exceeds the pressure threshold, the controller is configured to cause the second valve to move a third closed position to prevent the upstream pressure from flowing to the loading chamber via the second valve.

13. The system of claim 9, wherein the pilot system provides the control fluid to the loading chamber when the first valve is in a second closed position.

14. The system of claim 13, wherein the pilot system includes a first fluid regulator, a second fluid regulator, and a third fluid regulator.

15. The system of claim 14, wherein the first fluid regulator reduces the upstream pressure to a second pressure, and wherein the second fluid regulator reduces the second pressure to the control fluid provided to the loading chamber.

16. The system of claim 15, wherein the second fluid regulator causes the main fluid regulator to move to the first open position by flowing the control fluid into the loading chamber based on a difference between a spring force of the second fluid regulator and the downstream pressure acting on the second fluid regulator.

17. The system of claim 16, wherein the third fluid regulator causes the main fluid regulator to move to the first closed position by enabling the control fluid to vent from the loading chamber based on a difference between a spring force of the third fluid regulator and the downstream pressure acting on the third fluid regulator.

\* \* \* \* \*